US011727100B1

(12) United States Patent
Vemury

(10) Patent No.: US 11,727,100 B1
(45) Date of Patent: Aug. 15, 2023

(54) BIOMETRIC IDENTIFICATION USING HOMOMORPHIC PRIMARY MATCHING WITH FAILOVER NON-ENCRYPTED EXCEPTION HANDLING

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/080,554

(22) Filed: Dec. 13, 2022

Related U.S. Application Data

(60) Provisional application No. 63/350,733, filed on Jun. 9, 2022.

(51) Int. Cl.
| | |
|---|---|
| *G06F 21/32* | (2013.01) |
| *G06F 21/60* | (2013.01) |
| *G06F 21/62* | (2013.01) |

(52) U.S. Cl.
CPC ............ *G06F 21/32* (2013.01); *G06F 21/602* (2013.01); *G06F 21/6245* (2013.01)

(58) Field of Classification Search
CPC ..... G06F 21/32; G06F 21/602; G06F 21/6245
USPC ......................................................... 726/26
See application file for complete search history.

(56) References Cited

U.S. PATENT DOCUMENTS

| | | |
|---|---|---|
| 9,325,707 B2 | 4/2016 | Ketchantang |
| 9,900,147 B2 | 2/2018 | Laine et al. |
| 9,904,840 B2 | 2/2018 | Zhang et al. |
| 11,277,258 B1 | 3/2022 | Zhang et al. |
| 11,451,394 B2 | 9/2022 | Arora et al. |
| 11,496,288 B1 | 11/2022 | Soltani et al. |
| 2006/0112278 A1 | 5/2006 | Cohen et al. |

(Continued)

FOREIGN PATENT DOCUMENTS

| | | |
|---|---|---|
| WO | 2019112650 A1 | 6/2019 |
| WO | 20222201411 A1 | 9/2022 |

OTHER PUBLICATIONS

Otto, Nate et al., Verifiable Credentials Use Cases, W3C Working Group Note Sep. 24, 2019, https://www.w3.org/TR/2019/NOTE-vc-use-cases-20190924.

(Continued)

*Primary Examiner* — Jacob Lipman
(74) *Attorney, Agent, or Firm* — Lavanya Ratnam; Robert W. Busby; Nathan Grebasch

(57) ABSTRACT

Systems and methods for providing exception failover augmented, homomorphic encrypted (HE) distributing, end-to-endpoint persistent encryption, and distributed HE domain non-decrypting, privacy-protective biometric processing are provided. Some configurations may include generating HE biometric feature data, based on homomorphic encrypting the biometric feature data. Some configurations determine an exception status of the HE biometric feature data between exception and non-exception. Systems and methods may include performing a HE domain, non-decrypting biometric classifying of the HE biometric feature data.

22 Claims, 6 Drawing Sheets

(56) References Cited

U.S. PATENT DOCUMENTS

| | | |
|---|---|---|
| 2008/0097851 A1 | 4/2008 | Bemmel et al. |
| 2013/0148868 A1 | 6/2013 | Troncoso Pastoriza et al. |
| 2015/0046990 A1 | 2/2015 | Oberheide et al. |
| 2015/0186634 A1 | 7/2015 | Crandell et al. |
| 2016/0103984 A1 | 4/2016 | Warrier |
| 2016/0204936 A1* | 7/2016 | Sakemi .............. G06F 21/6227 380/28 |
| 2018/0053005 A1 | 2/2018 | Kamal |
| 2019/0044697 A1 | 2/2019 | Paz de Araujo et al. |
| 2019/0278937 A1 | 9/2019 | Streit |
| 2019/0280869 A1* | 9/2019 | Streit ................... H04L 9/3231 |
| 2019/0370688 A1 | 12/2019 | Patel |
| 2020/0044852 A1 | 2/2020 | Streit |
| 2020/0136818 A1 | 4/2020 | Jiang et al. |
| 2020/0228339 A1 | 7/2020 | Barham et al. |
| 2020/0228341 A1 | 7/2020 | Mohassel et al. |
| 2020/0358611 A1 | 11/2020 | Hoang |
| 2021/0124815 A1 | 4/2021 | Rindal |
| 2021/0211290 A1 | 7/2021 | Jindal et al. |
| 2021/0211291 A1 | 7/2021 | Jindal et al. |
| 2021/0344477 A1 | 11/2021 | Aharoni et al. |
| 2021/0377031 A1 | 12/2021 | Aharoni et al. |
| 2022/0085971 A1 | 3/2022 | Zhang et al. |
| 2022/0103362 A1 | 3/2022 | Chafni et al. |
| 2022/0109574 A1 | 4/2022 | Narumanchi et al. |
| 2022/0131698 A1 | 4/2022 | Badrinarayanan et al. |
| 2022/0277064 A1 | 9/2022 | Streit |
| 2022/0300593 A1 | 9/2022 | Brownlee |
| 2022/0321348 A1 | 10/2022 | Isshiki |
| 2022/0322083 A1 | 10/2022 | Kreishan et al. |
| 2023/0011633 A1 | 1/2023 | Waldron et al. |
| 2023/0033479 A1 | 2/2023 | Despiegel et al. |

OTHER PUBLICATIONS

Buolamwini, Joy et al., Gender Shades: Intersectional Accuracy Disparities in Commercial Gender Classification, Proceedings of Machine Learning Research, 81, pp. 1-15, 2018.

Gentry, Craig et al., "Homomorphic Encryption from Learning with Errors: Conceptually-Simpler, Asymptotically-Faster, Attribute-Based", Jun. 8, 2013.

Rivest, Ronald et al., On Data Banks and Privacy Homomorphisms, Massachusetts Institute of Technology, Cambridge, Massachusetts, 1978.

Paillier, Pascal, "Public-Key Cryptosystems Based on Composite Degree Residuosity Classes", Springer-Verlag Berlin Heidelberg, EUROCRYPT'99, LNCS 1592, pp. 223-238, 1999.

Sing, Harmeet, Public-Key Cryptosystem Based on Composite Degree Residuosity Classes aka Paillier Cryptosystem, Winter 2018.

Chillotti, Ilaria et al., "TFHE: Fast Fully Homomorphic Encryption over the Torus", Journal of Cryptology 33, published Apr. 25, 2019.

Boddeti, Vishnu Naresh, "Secure Face Matching Using Fully Homomorphic Encryption" Michigan State University, East Lansing, MI, Jul. 2018.

Liu, Qingshan, et al. "Occlusion Robust Face Recognition with Dynamic Similarity Features", 18th International Conference on Pattern Recognition (ICPR' 2006) 0-7695-2521-0/06, IEEE.

Nguyen, Hieu V. and Li Bai, "Cosine Similarity Metric Learning for Face Verification", DOI: 10.1007/978-3-642-19309-5_55, source: DBLP Nov. 2010, https://www.researchgate.net/publication/220745463.

Remani, Naga et al., "Similarity of Inference Face Matching on Angle Oriented Face Recognition", Journal of Information Engineering and Applications, ISSN 2224-5758 (print), ISSN 2224-896X (online). vol. 1, No. 1, 2011.

Ahdid, Rachid et al., "Euclidean & Geodesic Distance between a Facial Feature Points in Two-Dimensional Face Recognition System", International Journal of Neural Networks and Advanced Applications, vol. 4, 2017.

Boneh, Dan et al., "Evaluating 2-DNF Formulas on Ciphertexts" Apr. 2, 2006.

Vytautas Perlibakas, "Distance measures for PCA-based face recognition", Pattern Recognition Letters vol. 25(2004), pp. 711-724.

Eugenio A. Silva, "Practical use of Partially Homomorphic Cryptography", 2016.

P. Jonathon Phillips, "Support Vector Machines Applied to Face Recognition", Advances in Neural Information Processing Systems 11, technical report NISTIR 6241, 1999.

Sadeghi, Ahmad-Reza, et al., "Efficient Privacy-Preserving Face Recognition", ICISC, 2009.

TSA Biometrics Roadmap For Aviation Security & the Passenger Experience, Sep. 2018.

Chibba, Michelle, et al., "On Uniqueness of Facial Recognition Templates", NTIA US Department of Commerce, Privacy Multistakeholder Process: Facial Recognition Technology, Mar. 2014.

* cited by examiner

BIOMETRIC IDENTIFICATION USING HOMOMORPHIC PRIMARY MATCHING WITH FAILOVER NON-ENCRYPTED EXCEPTION HANDLING

CROSS-REFERENCE

This application claims the benefit of priority to U.S. Provisional No. Application 63/350,733 filed Jun. 9, 2022, incorporated by reference in its entirety.

This application incorporates by reference Ser. No. 18/080,294, filed on the same date as this application, entitled, "Third Party Biometric Homomorphic Encryption Matching for Privacy Protection," in its entirety.

STATEMENT OF GOVERNMENT INTEREST

The present invention was made by employees of the United States Department of Homeland Security in the performance of their official duties.

FIELD

The present disclosure relates generally to privacy protection in distributed processing of biometric information.

BACKGROUND

Computer-implemented methods of determining and verifying an individual's identity, e.g., in screening individuals prior to boarding aircraft, can include comparison of recently captured biometric information, e.g., a screening station capture of a traveler's face or fingerprints, against a previously stored biometric information from an individual with the same biographic information, or can be a 1:N or "one-to-many" comparison against a gallery of reference biometric images. Computation load can be high. Utilization of third-party computer resources, e.g., "cloud computing services," is sometimes considered as a potential option for at least reducing the computational load issue. Current techniques for using third-party computer resources, though, have shortcomings.

Another shortcoming is potential of false positives arising from "collisions" in the homomorphic encryption schemes, potential collisions.

SUMMARY OF THE INVENTION

Aspect of the invention may relate to a method for exception failover augmented, homomorphic encrypted (HE) distributing, and end-to-endpoint persistent encryption, and distributed HE domain non-decrypting, privacy-protective biometric processing. The method may comprise capturing a biometric information of an individual as a biometric record and computing a biometric feature data based at least in part on the biometric record. The method may comprise generating HE biometric feature data based at least in part on homomorphic encrypting the biometric feature data. The method may comprise determining an exception status of the HE biometric feature data, between exception and non-exception. The method may comprise HE distributing the HE biometric feature data to an external computer processing resource, and performing, by the external computer processing resource, a HE domain, non-decrypting biometric classifying of the HE biometric feature data and sending from the external computer processing resource to a designated destination a result of the HE domain, non-decrypting biometric classifying. Responsive to the exception status, the method may comprise performing a non-distributed classifying of the biometric feature data, or the biometric record.

BRIEF DESCRIPTION OF THE DRAWINGS

The drawing figures illustrate one or more implementations in with the teachings and disclosures herein and are by way of example, not by way of limitation. In the figures, like reference numbers refer to the same or similar elements. It will be understood that the drawings are not necessarily to scale.

DETAILED DESCRIPTION

Overview

In an embodiment a system controller can generate and provide, e.g., upload, to one or more third-party computer resources, respective HE domain processing configurations. The system controller may comprise multiple third-party computer processing resources and the system, e.g., the system controller, can provide respectively different HE domain processing configurations to the different third-party computer processing resources. That is a system may comprise: various third-party computer resources configured to receive a specifically generated HE domain processing configuration; and a system controller configured to provide the specifically generated HE domain processing configurations to the various third-party computer processing resources.

In an embodiment, the system controller can generate the HE domain processing configuration based, at least in part, on a reference gallery of verified biometric reference images, e.g., facial images, fingerprint images, or iris images, or combinations thereof. The reference gallery can correspond, for example, to "N" verified reference identities.

Figure 6:
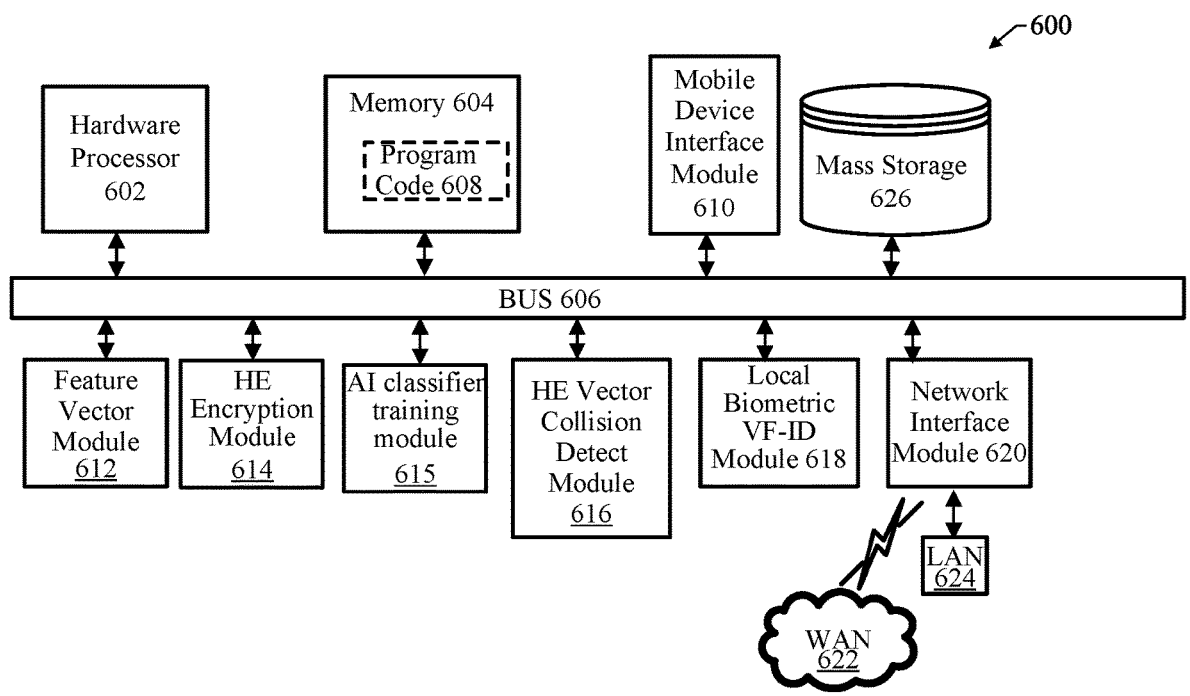
FIG. 6 shows a functional block schematic of a computer system on which aspects of systems and methods in accordance with the present disclosures can be practiced.

The system controller can comprise the structure of computer system 600 as described in FIG. 6.

In an embodiment, the system can include biometric capture, exception protective HE encryption and distribution units that can be located, for example and without limitation, in airports, train stations, entranceways to various controlled access facilities, and other environments. For brevity, "EP" is an abbreviation used herein for word sequence "exception protective," and "ECDS" is an abbreviation used herein for the word sequence "encryption and distribution." The phrase "biometric capture, exception protective HE encryption and distribution unit 202" is therefore interchangeably recited as "biometric capture, EP HE ECDS unit 202. The abbreviations "EP" and "ECDS" have no intrinsic meaning as used herein.

Biometric capture, EP HE ECDS units can include biometric capture devices, for example and without limitation, a fingerprint pad, a facial image capture camera, or combinations thereof. The biometric capture, EP HE ECDS units can include user interface devices, e.g., touchpad(s) and wireless communication device(s) for interfacing with, for example, smartphones, to receive biographic and other user-specific information.

In an embodiment, the biometric capture, EP HE ECDS units can include logic for extracting or otherwise computing characterization biometric information from the captured biometrics information. The characterization biometric information can be extracted as biometric feature vectors. In an embodiment, the biometric capture, EP HE ECDS units can include logic for privacy-protective HE encrypting the characterization biometric information, and logic for privacy-protective distributing, e.g., uploading via cloud services, the HE encrypted characterization biometric information to third-party computer resources.

In an embodiment, the biometric capture, EP HE ECDS units can include logic for conditioning the uploading/distributing the HE encrypted characterization biometric information based on a positive verification that the HE encrypted characterization biometric information is not an exception, and logic for performing, response to detecting that the HE encrypted information is an exception, a system-internal, not distributed biometric processing. The system-internal, not distributed biometric processing can use a cleartext of the captured biometric information or a clear text of the characterization biometric information, as described in greater detail in later paragraphs of this disclosure.

Regarding verification that the HE encrypted characterization biometric information is not an exception, in one or embodiments, the biometric capture, EP HE ECDS units can include an exception detection logic that maintains a memory of all HE encrypted characterization biometric information the unit has generated. For example, in an implementation in which the HE encrypted characterization biometric information is a Z-bit HE encrypted one-dimensional vector, the exception detection logic can, prior to uploading the Z-bit HE encrypted one-dimensional vector to the third-party computer resources, can check the memory to determine whether the same Z-bit HE encrypted one-dimensional vector is already stored. The exception detection logic can be configured to perform, in response to determining that the Z-bit HE encrypted one-dimensional vector is not already stored, operations of inserting the Z-bit HE encrypted one-dimensional vector in the memory and of uploading the Z-bit HE encrypted one-dimensional vector to the third-party computer resources. In an embodiment, the exception detecting logic can be configured to also check, in response to determining the same Z-bit HE encrypted one-dimensional vector is already stored, whether the already stored Z-bit HE encrypted one-dimensional vector was generated for the same user as the present Z-bit HE encrypted vector.

In one or more embodiments, the system controller logic for configuring the one or more third-party computer resources to perform respective HE domain processes can include logic for detecting exceptions in the generating of HE domain reference galleries. For purposes of description such exceptions can be referred to as "reference gallery exceptions," and occur, for example, when the HE encryption of reference gallery biometric information for a first reference gallery identity collides with, i.e., is identical to, HE encryption of reference gallery biometric information for a second reference gallery identity, notwithstanding differences between the first and second reference gallery information. In an embodiment, logic for detecting reference gallery exceptions can be configured to remove the HE encrypted biometric information corresponding to the collision, place the HE encrypted biometric information in an exception gallery, and distribute the exception gallery to the biometric capture, EP HE ECDS units.

As described in greater detail in paragraphs that follow, embodiments provide the HE encryption as a persistent encryption, meaning the HE encrypted characterization biometric information remains encrypted, and not decryptable by the third-party computer resources, or by any other entity not having system-provided permissions, throughout communications to the third-party computer resources, throughout all processing by the third-party computer resources, and continuing through third-party communications of results of such processing back to the biometric capture, EP HE ECDS unit or another system-designated recipient. The HE encryption scheme can be configured such that unauthorized obtaining of the user's underlying biometric information, e.g., by the third-party computer resource or by other entities, is not computationally feasible thereby improving, for example, privacy protection.

Other benefits include, but are not limited to, distributed, multi-sourced computational load-adaptive processing resources. Additional benefits can include, but are not limited to, dynamically adaptive processing capacity, with integrated, persistent-encryption carry-through protection against unauthorized access to users' underlying information.

Figure 1:
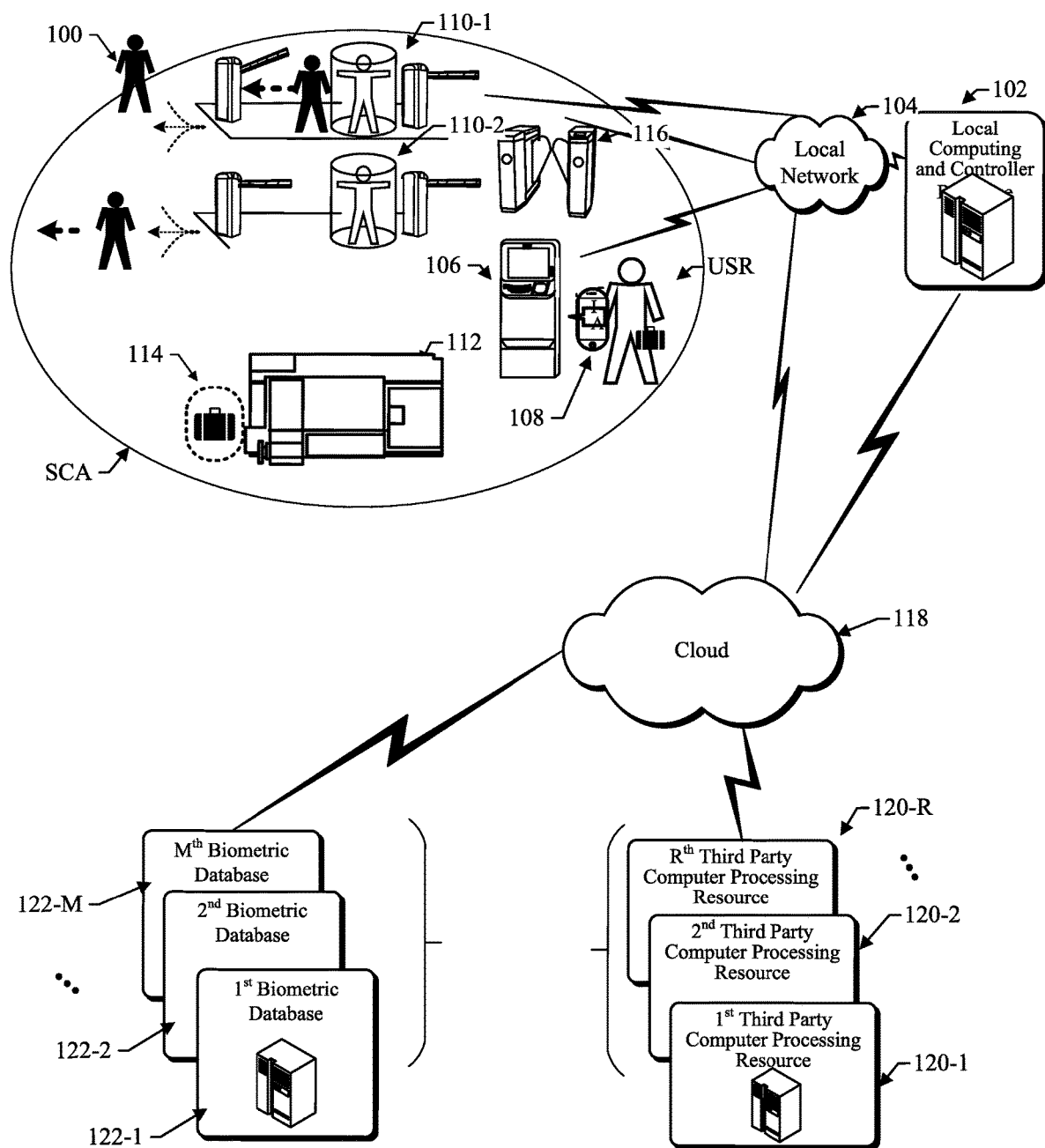
FIG. 1 shows a block schematic of an environment for secure privacy-protective, homomorphic encryption (HE) persistent encryption secured, non-decrypting biometric matching and verification processing in accordance with various embodiments.

FIG. 1 shows a block schematic of an environment 100 for secure distribution of biometric analysis and verification information, via HE locked, keyless distribution to external processing resources, configured for HE-domain, non-decrypting biometric verification and identification in accordance with the embodiments and teachings herein.

The environment 100 can include a local computing and controller resource 102 which can connect, for example, via a local network 104 to various traveler and baggage screening equipment, which can be located for example, within a screening area such as the example labeled SCA. Screening equipment within SCA can include, for example, a kiosk 106 that can be configured to interface with the local network 104. The kiosk 106 can include communication resources for wireless communication with a user's device, e.g., a smart phone, such as the example smart phone 108 shown carried by the user USR. The kiosk 106 can further include logic for capturing biometric information from the user USR, and for homomorphically encrypting the captured biometric information, as described in further detail in subsequent paragraphs. The kiosk may comprise the biometric capture, exception protective HE encryption and distribution unit.

Screening equipment in the screening area SCA can include a first millimeter wave (MMW) scanner 110-1 and a second MMW scanner 110-2, each communicatively connected via the local network 104 to a local computing and controller resource 102. Screening area equipment can also include a computer tomography scanner 112 (CT or CT scanner) for packages, checked carry-on luggage 114, or the like. While these devices are mentioned, it will be understood that other screening machines and technologies (e.g., a metal detector, trace chemical detector, magnetometer, identity verification devices, additional e-gates, mantrap, X-ray machines) can be included and can operate to a variety of thresholds based at least in part on design preference and resources to implement the described novel features and aspects.

Equipment in the screening area SCA can also include an electronic gate (e-gate) 116 that can communicatively connect, e.g., via the local network 104, to the local computing and controller resource 102. The e-gate 116 can include biometric matching technology, e.g., a fingerprint scanner, or a facial image capture device, or both.

The environment 100 can provide the kiosk 106 and the local computer and controller resource 102 access, via a cloud service 118, to third-party computer processing resources, such as the example first third-party computer processing resource 120-1, second third-party computer processing resource 120-2, . . . , and so forth, up to a $R^{th}$ third-party computer processing resource 120-R (collectively "third-party computer processing resources 120"). Implementations of the third-party computing resources 120 can include, for example, one or more server farms.

Environment 100 can also provide access, e.g., via the cloud service 118, for example to the local computer and controller resource 102, the kiosk 106, and the e-gate 116 access e.g., via the cloud service 118, to one or more reference galleries of biometric images, e.g., facial images or fingerprints, or both. In the FIG. 1 example, the reference galleries include a first biometric reference gallery 122-1, a second biometric reference gallery 122-2, and so forth, up to an $M^{th}$ biometric reference gallery 122-M.

In an embodiment, the kiosk 106, other kiosks, and other devices in the screening area SCA can be correspondingly configured to HE encrypt captured biometric information and distribute, e.g., upload via a cloud service, the HE encrypted biometric information to the third-party computing resources 120. In a corresponding manner, as described in further detail in later sections of this disclosure, embodiments can include logic for configuring the third-party computing resources 120 to classify the HE encrypted biometric information according to verified identities defined by the biometric reference galleries 122.

In an embodiment, the configuration logic can include, for example, logic for generating HE encrypted versions of the biometric reference galleries 122, as HE encrypted reference galleries, and for uploading the HE encrypted reference galleries to one or more of the third-party computing resources 120. As described in further detail in later sections of this disclosure, the third-party computer processing resources can thereby perform HE domain processing of biometric information, including biometric matching, without access to the underlying biometric information of the USR, without access to the underlying reference biometric information content of the HE encrypted reference galleries without access to the verified identities defined by the biometric reference galleries 122.

In the environment 100 can also include logic for detecting various exceptions and for real-time response to same via failover biometric processing. Logic for detecting various exceptions can include, as described in further detail for example in reference to FIGS. 2 and 4, logic for real-time detecting, e.g., in the kiosk 106, of HE encryption collisions, and logic for failover biometric processing in response, logic, e.g., via logic that can be included in the kiosk 106, in the logic for configuring the third-party computer processing resources for performing HE domain processing of biometric information, or both, various exception handling features. The exception handling features can provide robust technical solutions to statistical events termed "collision," that can occur in certain HE encryption operations.

In overview, assuming that a traveler (e.g., Passenger, User or "USR"), purchases a ticket for a flight. The USR will arrive at the airport and walk up to the kiosk 106 to obtain a boarding pass. It will be assumed that prior to USR's arrival, the system 100 has uploaded to one or more of the third-party computer resources 120 an HE encrypted reference gallery, obtained for example, from one or more of the biometric reference galleries 122. Operations at the kiosk 106 can include USR inputting, via an app on her or his smart phone 108, various biographic information, e.g., her or his full name, date of birth, mailing address, and so forth. Subsequently, kiosk 106 can performs a capturing of biometric information from USR, e.g., a facial image or fingerprints or both, followed by computing a HE encryption of the biometric information, or of particular features the kiosk 106 obtains or extracts from the biometric information, i.e., from the facial images and fingerprints.

Obtaining or extracting of features, as described in further detail in subsequent paragraphs, can include but is not limited to applying one or more orthogonal basis function transforms, e.g., the Discrete Cosine Transform (DCT). Obtaining or extracting of features can also include applying feature filters, e.g., convolving of one or more two-dimensional spatial filters. In various embodiments, such transforms or application of feature filters generates a one-dimensional V-element vector, as opposed to the original row-by-column pixel array. For purposes of description, such one-dimensional V-element vectors will be generally referred to as "feature vectors," The kiosk 106 HE encryption of the feature vector will be a one-dimensional vector of V HE encrypted elements.

The HE encryption performed by the kiosk 106 can utilize a private key, and the HE encryption scheme can be configured such that an attempting entity, without possessing requisite permissions, e.g., the private key, cannot obtain the underlying biometric information through computationally feasible analysis.

After kiosk 106 computes the HE encryption of the biometric information, e.g., the HE encrypted feature vector, the kiosk may perform an exception check to determine whether the current HE encrypted feature vector is identical to the HE encrypted feature vector the kiosk 106 computed for the biometric information the kiosk 106 captured from a previous user. Such instances are referenced herein as "collisions," and are described in further detail below. As also described further detail below, in various embodiments the kiosk 106 can include, in addition to logic for detecting collisions, logic for performing or initiating performing of a not-distributed, system-internal biometric image identification or verification process. The process is referred to herein as "failover" processing.

Assuming an exception is not detected, the kiosk 106 can distribute, for example, through the local computing and controller resource 102, or through local network 104, or both, via the cloud service 118, the USR's HE encrypted biometric information, e.g., the HE encrypted feature vector to one or more of the third-party computing resources 120. As described above, the third-party computer resources 120 can possess one or more HE encrypted reference galleries provided, for example, by one or more of the biometric reference galleries 122. The HE encrypted reference biometric images can be encrypted using the same HE scheme used to encrypt USR's captured biometric information. USR's reference biometric information is in one of the biometric reference galleries 122 captured, by way of example, when the USR pre-registered, joined or qualified for an expedited passenger boarding program.

In various embodiments, the third-party computer resource 120 can then perform an HE domain biometric identification of the USR, for example, by comparing the USR's HE encrypted biometric information against the third-party computer resource 120 above-described uploaded copy of the HE encrypted reference gallery, using an HE domain vector similarity or distance algorithm, to find the closest match, if any, meeting a similarity threshold.

If there is a match, the third-party computing resource 120 can send a positive result, and a non-informational identifier for the matching HE encrypted reference image to the kiosk 106. In one aspect, the kiosk 106 or a resource accessible to the kiosk 106 via, e.g., the local network 104, can retrieve biographical information about the user corresponding to the non-informational identifier.

Figure 2:
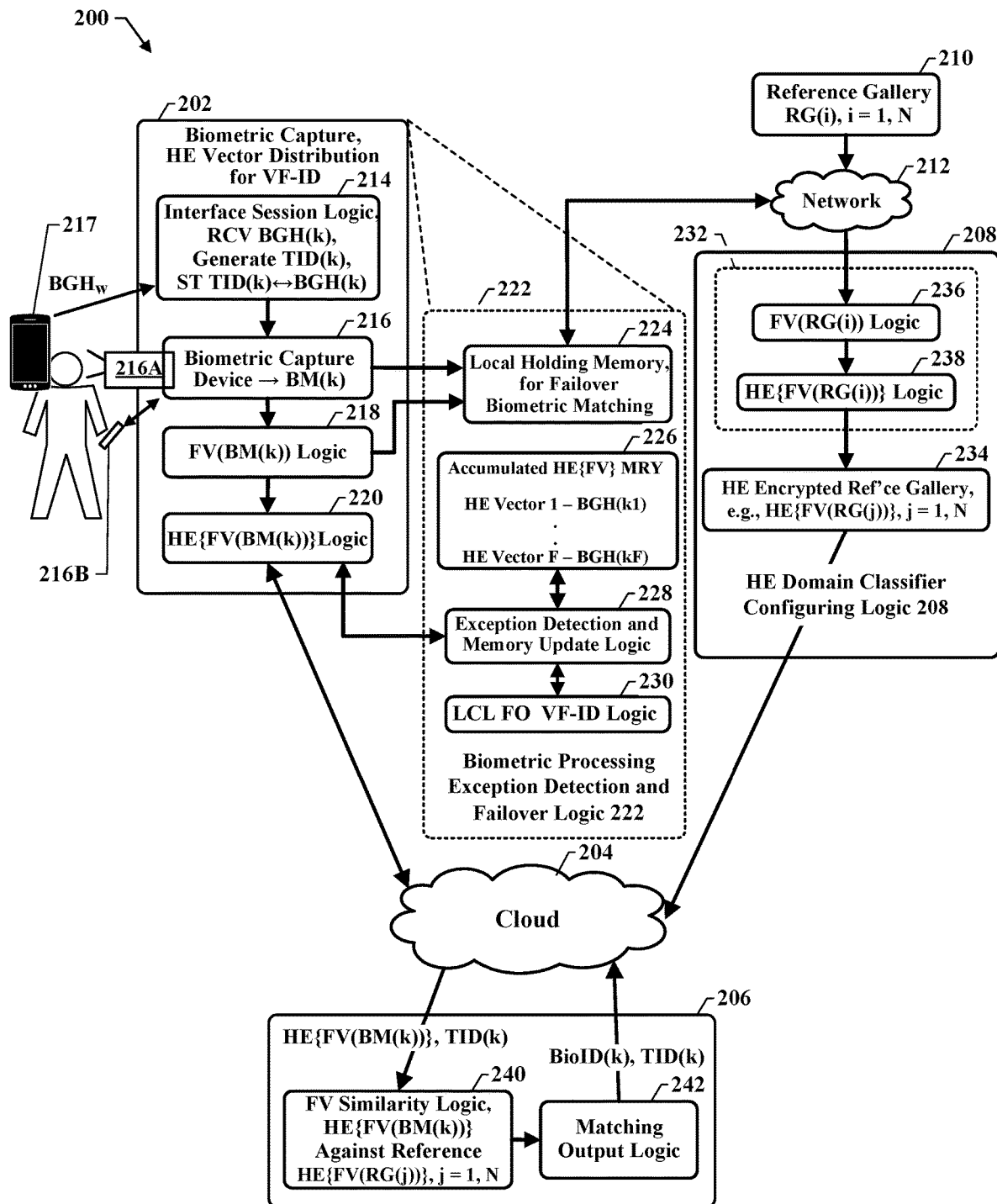
FIG. 2 shows a functional block schematic of a system for secure privacy-protective HE distribution and persistent encryption HE secured, non-decrypting distributed biometric processing, with local exception detection and cleartext failover in accordance with various embodiments.

FIG. 2 shows a functional block schematic of a system 200 for HE encrypted, privacy-protective, dynamically expandable, distributed resource biometrics identification and verification processing, with exception based local cleartext failover, in accordance with various teachings and embodiments herein. In an embodiment, system 200 can include a biometric capture, exception protective HE encryption and distribution unit 202, which can connect, for example, via cloud service 204, to a third-party computer resource 206. In an embodiment, system 200 can include a system controlled third-party HE process configuring logic 208. The system controlled third-party HE process configuring logic 208, according to an embodiment, can interface to a reference gallery 210, directly or via a network 212. The system controlled third-party HE process configuring logic 208 can also interface to, and thus configure the third-party computer resource 206, e.g., via the cloud service 204.

Features of the biometric capture, EP HE ECDS unit 202 can include capturing biographic information, such as name, address, date of birth, from a user, and capturing biometric information of the user, e.g., facial image or fingerprints, or both. According to various embodiments, the biometric capture, EP HE ECDS unit 202 can be configured to HE encrypt the biometric information, determine whether a result of the HE encrypting process is a valid HE encryption value as opposed to being an exception. An exception can be an HE encryption value identical to an HE value generated previously, for another, earlier user. Identical HE encryption values can arise irrespective of differences of appearance between the earlier user and the present user. Such instances can be referred to, for example, as "collisions" or "collision instances."

Features provided by systems and methods according to various embodiments include real-time detecting of collisions and, in response, real-time switchover, to a failover, non-distributed, biometric matching process, as described in further detail in later sections of this disclosure. Technical features and benefits of the collision detection and failover biometric processing in accordance with various embodiments can include, but are not limited to, mitigation of costs that may be incurred by collisions. Further technical features and benefits, as will be understood and appreciated by persons of ordinary skill upon reading this disclosure as a whole, can include additional freedom or latitude in selecting HE algorithm(s) to be applied by the biometric capture, EP HE ECDS unit 202, and by the third-party computer resource 206. More specifically, in accordance with various embodiments, HE schemes used by the biometric capture, EP HE ECDS unit 202 are preferably consistent with HE encryption schemes under which HE domain processing, e.g., 1:N biometric matching against a gallery of N HE encrypted reference images, is performed by the third-party computing resource 206. Considerations in selecting the HE algorithm(s) can be application-specific, but can include collision statistics, as well as, for example, the different HE algorithms' respective available options of arithmetic operations, e.g., addition, multiplication, inverse multiplication, i.e., division, and others, and a maximum number of times the different arithmetic operations can be performed. The mitigation of costs due to collision may render feasible or usable certain HE encryption algorithms that may offer a larger library of arithmetic operations, or larger number of maximum repeats of the operations than lower collision rate algorithms.

According to various embodiments, HE collision detection logic featured in the biometric capture, EP HE ECDS unit 202 can include logic and memory for run-time constructing of a database of HE entries. Each entry in the database can be a data pair, one part of the pair being a biographic information received from a user, e.g., by the FIG. 1 kiosk 106 from the user's smart phone, and the other part of the pair being an HE encryption of a biometric information captured from the user. Operation of the EP HE ECDS unit 202 can include an initialization that can empty the HE entry database. After the initialization, when a first user arrives at the biometric capture, EP HE ECDS unit 202 can receive biographic information of the user, capture biometric information from the user, HE encrypt the biometric information and, prior to distributing the HE encrypted biometric information to the third-party computer resource 206, can check the HE entry database to determine whether the identical HE value has been previously generated. As described in further detail in later paragraphs, an answer of "yes" from checking the HE entry database may indicate a collision, meaning the present HE encrypted biometric information is identical to an earlier generated HE encryption of a biometric information captured from a different user, notwithstanding the earlier user and the present user having different biometric appearances. An answer of "yes" may also result from a previous use, by the same user, of the same biometric capture, EP HE ECDS unit 202. E.g. the biometric capture, EP HE ECDS unit 202 may be configured to execute a failover process to manage a collision caused by the earlier user and present user being the same person. Failover features in accordance with various embodiments, described in further detail in paragraphs below, can provide a resolving, for example, between these two potential causes of the "yes" and can provide an alternative, non-distributing, biometric matching in instances where the cause is a collision. Logic for alternative, non-distributing, biometric matching can include logic for communicating the cleartext of the captured biometric information, or a system-internal encryption of the captured biometric information, or extraction therefrom, to a system internal resource for matching, e.g., against a cleartext reference gallery.

In an embodiment, biometric capture, EP HE ECDS unit 202 can include interface session logic 214 that can be configured to receive biographical information about a user, and to assign a temporary identifier to the action, or interaction between the user and the biometric capture, EP HE ECDS unit 202 through which the unit 202 receives the biographical information. E.g. the interface session logic may be configured to assign a temporary identifier associated with action or interaction between the user and the biometric capture, EP HE ECDS unit that receives the biographical information. The biographic information BGH(k) can include, e.g., the kth user's full name, date of birth, and mailing address. The interface session logic 214 can be configured to receive the biographic information BGH(k) from a digital wallet, e.g., supported by an application on the kth user's smart phone, laptop, tablet or other suitable means for transmitting biometric information.

For purposes of description, the above-introduces action or interaction is termed a "session." It will be understood, though, that "session" as used herein, encompasses a broad range of actions and interaction through which the system 200 receives biographical information regarding the user. For example, in an embodiment, the biometric capture, EP HE ECDS unit 202 may be configured to receive, from sources other than a user or the user's smart phone, biographical information for a user. The biometric capture, EP HE ECDS unit 202 may be further configured to receive geometric position information for the user, and the unit 202 can be configured to respond by capturing biometric information from the user. The capturing can be, but is not necessarily known to the user. Such actions, collectively, can be an example "session." The interface session logic 214 can correspondingly assign such a session temporary identifier. For purposes of description the user is referenced as the kth user, the temporary identifier is correspondingly labeled as "TID(k)" and the biographic information labeled as "BGH(k)." Specific actions and events triggering assignment of TID(k) can include, but are not limited to, receipt of initiating action by the kth user, for example, without limitation, the kth user manually interacting with a graphical user interface (GUI) of the biometric capture, EP HE ECDS unit 202.

According to an embodiment, the interface session logic 214 of the biometric capture, EP HE ECDS unit 202 can be further configured to store a correspondence, labeled on FIG. 2 as TID(k)↔BGH(k), between the biographic information BGH(k) and the temporary identifier TID(k). As described in further detail in later sections of this disclosure, the biometric capture, EP HE ECDS unit 202 can include logic for appending TID(k) to communications from the unit 202 to the third-party computer resource 206 of HE encrypted biometric information of the kth user. The third-party computer resource 206 can also be configured to append TID(k) to processing results the resource 206 communicates, for example, back to the biometric capture, EP HE ECDS unit 202.

According to an embodiment, the biometric capture, EP HE ECDS unit 202 can include a biometric capture device 216, which can be configured to capture one or more types of biometric information, generically labeled BM(k), of the kth user. The capture can be, for example, in further response to the above-described initiating action by the kth user.

The biometric capture device 216 can include, for example, a facial image capture camera 216A, or can include a fingerprint capture device 216B, or can include both. In implementations including the facial image capture camera 216A, the biometric information BM(k) can be a facial image, captured as a row-by-column pixel array, e.g., of grey scale or red-green-blue (RGB) pixel values. Row-by-column pixel arrays can include substantial redundant information. Also, HE encryption of a row-by-column pixel array can produce large files. The biometric capture, EP HE ECDS 202 can therefore include biometric feature vector logic 218 that can be configured to compute, from the biometric information BM(k), a biometric feature vector FV(BM(k)). The biometric feature vector logic 218 can be configured to compute FV(BM(k)) using, e.g., an orthogonal basis function transformation such as, but not limited to, DCT, DWT, Walsh Transform, WHT, and combinations thereof. The biometric feature vector logic 218 be configured to discard some of the transform values. For example, in implementations of the biometric feature vector logic 218 using DCT as the feature vector algorithm, configurations can discard certain frequency bins or ranges of frequency bins of the DCT of BM(k). In an embodiment, the biometric capture, EP HE ECDS unit 202 can include a HE encrypting logic 220 for HE encrypting of FV(BM(k)) to generate HE{FV(BM(k))}.

In accordance with HE encrypting processes, though, there can be instances in which HE encryption of the feature vector of a first user's biometric information can be identical to the HE encryption of the feature vector of a second user's biometric information, irrespective of the two feature vectors having different values. In other words, referring to the first user feature vector as FV(BM(k1)), and the second user feature vector as FV(BM(k2)), k1 not being equal to k2, and FV(BM(k1)) not being equal to FV(BM(k2)), there can be instances of HE{FV(BM(k1))} being identical to HE{FV(BM(k2))}. Such instances are termed "collisions."

System 200 may include exception detection and failover logic 222 for detecting collisions as an "exception," and providing failover biometric processing in response. Failover processing provided by the biometric processing exception detection and failover logic 222 can include biometric classification, e.g., relative to the biometric reference gallery 210, of a cleartext version of the feature vector FV(BM(k)) computed by the biometric feature vector logic 218 or, in one or more embodiments, of a cleartext version of the captured biometric image BM(k). Therefore, in accordance with one or more embodiments, the exception detection and failover logic 222 can include a holding memory 224, which can be configured to store, for example, temporarily as described in further detail in paragraphs below, a copy of the captured biometric information BM(k) and, in an aspect, a copy of the biometric feature vector FV(BM(k)).

In an embodiment, the exception detection and failover logic 222 can include an accumulated homomorphic encrypted feature vector memory 226, labeled "Accumulated HE{FV} MRY" 240 on FIG. 2. The exception detection and failover logic 222 and can also include, communicatively connected to the accumulated homomorphic encrypted feature vector memory 226, an exception detection and memory update logic 228. The exception detection and memory update logic 228 can be communicatively connected to the HE encrypting logic 220 of the biometric capture, EP HE ECDS unit 202. In an aspect, the HE encrypting logic 220 can be configured such that uploading of HE{FV(BM(k))} can be conditioned on verification by the exception detection and memory update logic 228 that the HE{FV(BM(k))} value is not a collision with an earlier HE{FV(BM(k'))}, FV(BM(k')) being an earlier computed biometric feature vector FV(BM(k')), for a biometric image BM(k') captured from a k' user.

In an embodiment, the exception detection and failover logic 222 can include a local failover verification and identification logic 230, labeled "LCL FO VF-ID Logic" on FIG. 2, for controlling the above-described biometric classification, e.g., relative to the biometric reference gallery 210, of the cleartext feature vector FV(BM(k)) or the cleartext captured biometric image BM(k) held in the holding memory 224.

Referring to FIG. 2, in accordance with one or more embodiments, in response to exception detection and memory update logic 228 determining HE{FV(BM(k))} is not a collision with an earlier HE{FV(BM(k'))}, the HE encrypting logic 220 can upload HE{FV(BM(k))} and TID (k), via cloud service 204, to the FV similarity logic 240 of the third-party computer resource 206. A matching output logic 242 of the third-party computer resource 206 can send a classification result, along with TID(k), to the biometric capture, EP HE ECDS biometric capture unit 202 or another recipient.

The system 200, kiosk 106 and/or third-party resource 206 can be configured to upload HE encrypted biometric information to a biometric reference gallery holding biometric information in memory.

In an embodiment, the system 200 can include an HE domain classifier configuring logic 208 for configuring the third-party computer resource 206 to perform non-decrypting HE domain classifying of the above-described uploaded HE encrypted biometric information of the user. Configuring the third-party computer resource 206 can include configuring for non-decrypting HE domain 1: N classifying of the user's HE encrypted biometric information against N verified reference identifies for which a biometric reference gallery 210 stores reference biometric information. The biometric reference gallery 210, can be configured to store a gallery of biometric reference images, such as the examples labeled RG(i), i=1 to N, collectively referenced for purposes of description as "biographic reference images RG." The biographic reference images RG can be captured from a population of N different, verified individuals.

The biometric reference gallery 210 can be configured to store, for each of N identities, one or more biometric reference images RG, of one or more biometric types. The biometric reference gallery 210 may be configured to store, by way of example biometric reference images RG, eye scan images, facial images, fingerprint images, or combinations thereof, for each of N identities. Biometric reference images RG can also include, for example, different capture angles, different lightings, different facial expressions, different fingers, and so forth. Biometric reference images RG stored in the biometric reference gallery 210 can also include, for example and without limitation, other distinguishing biometric features, e.g., and without limitation, gait or other distinguishing movement characteristics as movement.

According to various embodiments the biometric reference gallery 210 can be formed as a combination of multiple reference galleries, which may be individually maintained, for example and without limitation, by various state government departments of motor vehicles or other government agencies, by the Federal Government, or by membership-based organizations, or combinations thereof.

In one or more embodiments, the HE domain classifier configuring logic 208 can include HE encrypted reference gallery generating logic 232, configured for generating a HE encrypted biometric reference gallery 234, HE{FV(RG(i))}, i=1 to N. The HE domain classifier configuring logic 208 can also include logic for uploading the HE encrypted biometric reference gallery 234 to the third-party computer resource 206. According to various embodiments, the HE encrypted biometric reference gallery 234 entries can be HE encryptions of feature vectors, FV(RG(i)), of the reference gallery images RG(i), as opposed to HE encryptions of, for example, row-by-column pixel arrays in which the images RG(i) may be stored. Reasons can include row-by-column pixel arrays being, in some applications, large files that can include substantial amounts of redundant information. Various feature vector algorithms can compute or extract from row-by-column pixel arrays particular biometric features, removing information redundancy than row-by-column pixel arrays and statistically likely to be unique to the user and likely to less redundant. The resulting FV(RG(i)) file size can therefore be substantially smaller than RG(i). The smaller file size can render HE{FV(RG(i))} significantly more computationally feasible, storage feasible, and communication feasible than HE{RG(i)}. Specific implementation of HE encrypted reference gallery generating logic 232 can include feature vector generating logic 236, which can connect to the biometric reference gallery 210 via network 212 as shown in FIG. 2 or directly, for generating FV(RG(i), for i=1 to N. The feature vector generating logic 236 can be configured to generate FV(RG(i) based, for example, on applying an orthogonal basis transformation, e.g., and without limitation, a Discrete Cosine Transform (DCT), Discrete Wavelet Transform (DWT), Walsh Transform, or Walsh Hadamard Transform (WHT) to each RG(i). The biometric feature vector generating logic 218 can be further configured to generate the above-identified transforms, and other transforms, as binary values vectors. For example, the feature vector generating logic 236 can be configured to generate FV(RG(1)) as a 128 point, binary-valued DCT, which would be a string of 128 binary 1s and binary 0s. It will be understood that the value "128" is only one example and is not a limitation on practices according to embodiments and teachings herein.

The HE encrypted reference gallery generating logic 232 can include HE encryption logic 238, for generating HE{FV(RG(i))}, for i=1 to N, and logic for uploading of the HE encrypted biometric reference gallery 234, e.g., HE{FV(RG(i))}, i=1 to N, to the third-party computer resource 206. Uploading logic may be configured to upload the HE encrypted biometric reference gallery 234 via the cloud service 204. One example logic configuration in the third-party computer resource 206 that can receive HE encrypted biometric reference gallery 234, HE{FV(RG(i))), i=1 to N, can include feature vector similarity logic, labeled "FV Similarity Logic, HE{FV(BM(k))}Against Reference HE{FV(RG(i))}, i=1, N." The third party computer resource may comprise feature vector similarity logic (FV Similarity Logic, HE{FV(BM(k))}Against Reference HE{FV(RG(i))}, i=1, N); the feature vector similarity logic determining a level of similarity between a current HE encrypted feature vector of biometric information k against a reference list of HE encrypted feature vectors reference gallery information i through N.

Features and benefits provided by embodiments as shown by the FIG. 2 example system 200 include run-time detection, by the biometric capture, HE encrypted distribution station 202, of the collision type exception, and real-time responsive adaptation to such exception through failover, non-distributed cleartext biometric processing.

Figure 3:
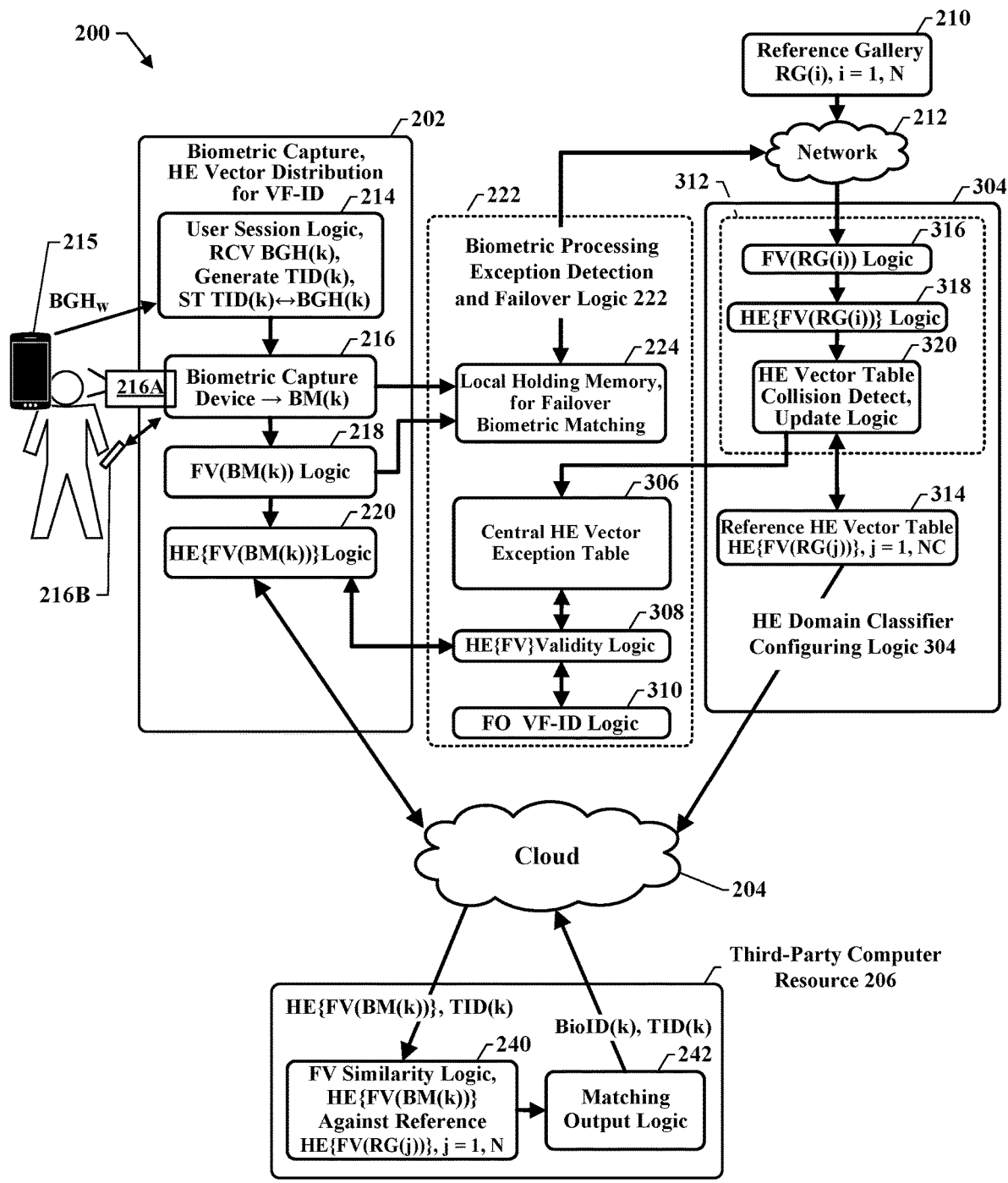
FIG. 3 shows a functional block schematic of another system for secure privacy-protective HE distribution and persistent encryption HE secured, non-decrypting distributed biometric processing, with a prior distribution of exceptions, for local cleartext failover in accordance with various embodiments.

FIG. 3 shows a functional block schematic of a system 300 for secure privacy-protective HE distribution and persistent encryption HE secured, non-decrypting distributed biometric processing, with a priori distribution of exceptions, for local cleartext failover in accordance with various embodiments. To focus on concepts and features particular to the system 300, without obfuscation with introduction and detailed of another environment, the FIG. 3 example is shown as an adaptation of the system 200. As such, like-numbered features are not necessarily described again except where interacting with particular features and operations of the system 300.

System 300, in accordance with disclosed embodiments and teachings, can include the FIG. 2 biometric capture, HE encrypted distribution station 202, biometric processing exception detection and failover logic 222, and HE domain classifier configuring logic 304, which can generate, for uploading to the third-party computer resource 206, a reference gallery 210 comprising HE encryption of distinguishing information regarding each of up to M of the M biometric reference images. In various embodiments, the HE encryption of distinguishing information is for up to M and not always M, because as described in further detail in paragraphs below, information there may be collisions.

The biometric processing exception detection and failover logic 222 may comprise: a Central HE Vector Exception Table 306; a HE{FV}Validity Logic 308; a FO VF-ID Logic 310, HE FV table 312; a Reference HE FV Table 314, for HE{FV(RG(j))}, j=1, NC; a FV(RG(i)) Logic 316; a HE{FV(RG(i))} Logic 318; and a HE Vector Table Collision Detect, Update Logic 320.

In one or more embodiments that include a plurality of third-party computer resources 206, the HE encrypted biometric reference gallery generating logic 232 can be configured to upload HE encrypted versions of different portions of the biometric reference gallery 210 to different ones of the third-party computer resource 206.

The generating can start, for example, at RG(i), for i=1. Operations can include retrieving the RG(1) biometric reference image from the cleartext biometric reference gallery 210, and feeding RG(1) obtain the HE encrypted FV for RG(1), i.e., HE{FV(RG(1))}. The HE vector collision detect logic 320 can then receive HE{FV(RG(1))} and check to determine if the reference HE FV table 314 already includes a HE vector of identical value. Since the assumed starting state includes an empty reference HE FV table 314, the determination will be "no." The HE vector collision detect logic 320, in response to the "no," will load HE{FV(RG (1))} into the reference HE FV table 314. The process of constructing the reference can then perform another iteration, select another biometric reference image from the cleartext biometric reference gallery 210, e.g., can increment the index i from 1 to 2, and retrieve the RG(2) biometric reference image from the gallery 210, and feed RG(2) to HE FV logic 318 to obtain HE{FV(RG(2))}. The process can then check the reference HE FV table 312 again, this time to determine whether the table 312 already includes a HE encrypted FV having the value HE{FV(RG(2))}. Assuming the answer is "no," the process will load HE{FV(RG(2))} into the reference HE FV table 312.

As will be understood, the FIG. 2 and FIG. 3 systems can be combined, such that the biometric capture, EP HE ECDS unit 202 an include the runtime locally constructed memory and can include the centrally constructed and distributed memory. When HE{FV(BM(k))} is generated the biometric capture, HE encrypted distribution station 202 checks the local memory and the local copy of the centrally generated and distributed memory. If the answers are "No," the HE{FV(GM(k))} is added to the local memory and uploaded to the third-party computer resource 206.

Figure 4:
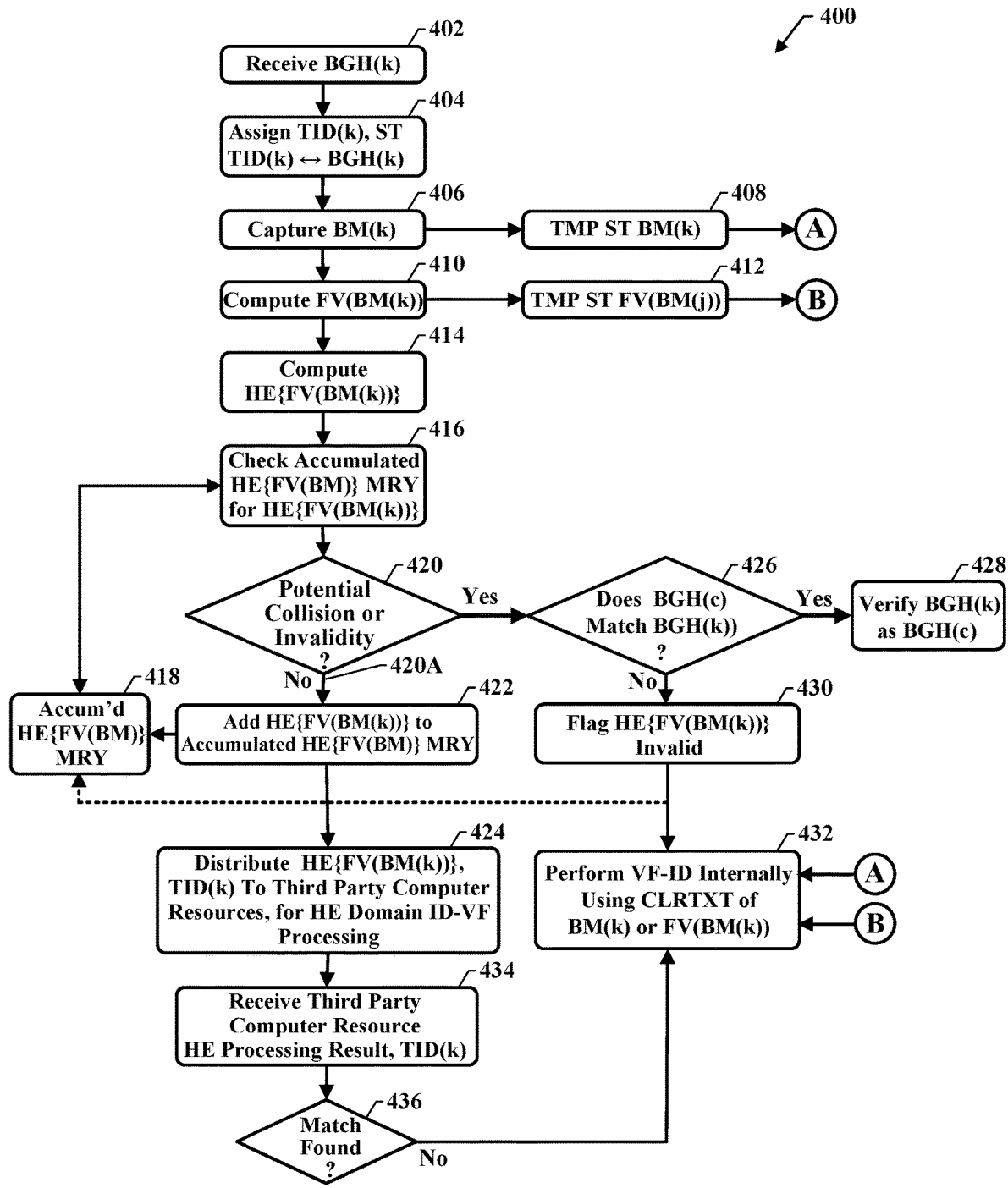
FIG. 4 shows a logic flow chart of operations in a process for privacy-protective, non-decrypting, distributed HE domain biometrics identification and verification, including local exception detecting, cleartext failover, and exception database updating, in accordance with various embodiments.

FIG. 4 shows a logic flow chart of example operations in a flow 400 of a process in one or more embodiments of distributed privacy protective, HE persistent encryption locked, non-decrypting biometric identification and verification processing, with exception failover backup, in accordance with disclosed embodiments. Illustrative instances operations in the flow 400 will be described with reference to FIG. 1 and FIG. 2. The references to FIG. 1 and FIG. 2 are for convenience to the reader and are not intended to limit practices according to FIG. 4 to environments and systems of FIG. 1 and FIG. 2. Description of the flow 400 assumes the third-party computer resource 202 has received an HE encrypted reference gallery of N HE encrypted reference files, each corresponding to a verified reference identity, and is configured to receive from the biometric capture, EP HE ECDS unit 202, in response to user interactions with the unit 202, HE encrypted feature vectors representing captured facial image information, and to perform HE domain, non-decrypting N+1 class classification of the HE encrypted feature vectors, using a vector similarity algorithms as described above. In accordance with various embodiments, operations in the flow 400 include operations of detecting an exception, and operations in response to detecting the exception, failover processing by the biometric capture, EP HE ECDS unit 202, as described in reference to FIG. 2.

An example instance of the flow 400 will assume a-priori initialization of the "k" index at integer 1, and an initial empty state of the accumulated HE{FV} memory.

For purposes of description, the 202 configuration will be described as vector similarity. This is not a limitation, the description can be readily adapted to operations a process configuration of 202 using, for example machine learning trained N-class classifier, for receiving HE(FV(BM(k))}.

Operations in the flow 400 can include receiving 402, e.g., by the biometric capture, EP HE ECDS unit 202, a biographic information BGH(k) from a user. The user may, for example, have walked up to the FIG. 1 kiosk 106, and the user or the kiosk or both the first user's digital wallet, e.g., provided by an application on the user's smart phone, laptop, or tablet or other suitable means for transmitting biometric information to the kiosk 106. The biographic information BGH(k) can include e.g., as described above in reference to FIG. 2, a full name, date of birth, mailing address and so forth. In an embodiment, operations in the flow 400 can include, associated with the session assigning 404 a temporary identifier, such as TID(k), and storing 404 a correspondence, represented in FIG. 4 as TID(k)↔BGH (k), for example in a memory of the kiosk 106. For the first user, TID(k) is TID(1) and the stored correspondence is TID(1)↔BGH(1). proceed to capturing 406 biometric information BM(k) of the user. The capturing 406 of BM(k) can be performed, for example, by the FIG. 2 camera 230A. The biometric information BM(k) can be, for example, a row-by-column pixel array, e.g., grey scale or red-green-blue (RGB), of the user's face. To obtain a smaller file size, lower, less redundant . . . described above.

According to an embodiment, associated with capturing 406 the biometric information BM(k), the flow 400 can include storing 408 a copy of the captured biometric information BM(k), for potential use in a fail-over process described in further detail in paragraphs below. From capturing 406 the biometric information BM(k), and the storing 408 a copy of same, the flow 400 can proceed to computing 410 a feature vector, FV(BGH(k)) for BM(k). Technical features of the FV(BGH(k)) can include representation of biometric features unique to the $k^{th}$ with a substantially smaller file size than the original pixel array. Associated with computing 410 the FV(BGH(k)), flow 400 can include storing 412 a copy of the FV(BGH(k)).

Operations in the flow 400 can include HE encrypting 414 the feature vector FV(BM(k)) to obtain HE{FV(BM(k))}. In accordance with one or more embodiments, operations in the flow comparing 416 HE{FV(BM(k))} to the accumulated HE{FV(BM)} memory 418 of previously used HE {FV(BM(k))}.

If the comparing 416 is a negative outcome (indicates "no,") i.e., HE{FV(BM(k))} is not already in the accumulated HE{FV(BM)} memory 418, operations in the flow 400 can, as shown by the "No" output from the operations flow logic 420A, operations in the flow 400 can include inserting 422 the HE{FV(BM(k))} into the accumulated HE{FV (BM)} memory 418, then proceeding to distributing 424 HE{FV(BM(k))} to third-party computer resources, for HE Domain ID-VF Processing.

If the comparing 416 is a positive outcome (indicates "yes,") the user for which the accumulated HE{FV(BM))} value which is identical to the current HE{FV(BM(k))} was generated will be referred to, for purpose of description, as the "$c^{th}$" user. Operations in the flow 400 can then determine 426 whether the biographical information for the $c^{th}$ user matches the biographical information for the current $k^{th}$ user. If the determination at 426 is "yes" operations in the flow 400 can proceed to verifying 428 the current $k^{th}$ as the $c^{th}$ user. Operations at 428 can also include uploading HE{FV (BM(k))} to the third-party computer resources 206.

If the determination at 426 is negative (e.g. a "no,") operations in the flow 400 can proceed to flagging 430 HE{FV(BM(k))} as invalid, i.e., as an exception based on a collision, and can then proceed to performing 432 a system-internal cleartext biometric process, e.g., using a cleartext of the captured biometric information BM(k) or a cleartext of the feature vector FV(BM(k)).

Assuming HE{FV(BM(k))} is distributed 424 to the third-party computer resource 206, operations in the flow 400 can include, after a duration, receiving 434 the third-party computer resource HE processing result, which can include TID(k). Operations in the flow 400 can include verifying or determining 436 whether a match was found. In one aspect, if the answer is "yes" the flow 4000 can be complete, with respect to the current user.

Operations in the flow 400 can include determining 436 whether a match is found. If the answer is no, operations can proceed to 432 and perform system internal cleartext biometric processing, using a cleartext form of BM(k) or a cleartext form of FV(BM(k)).

Figure 5:
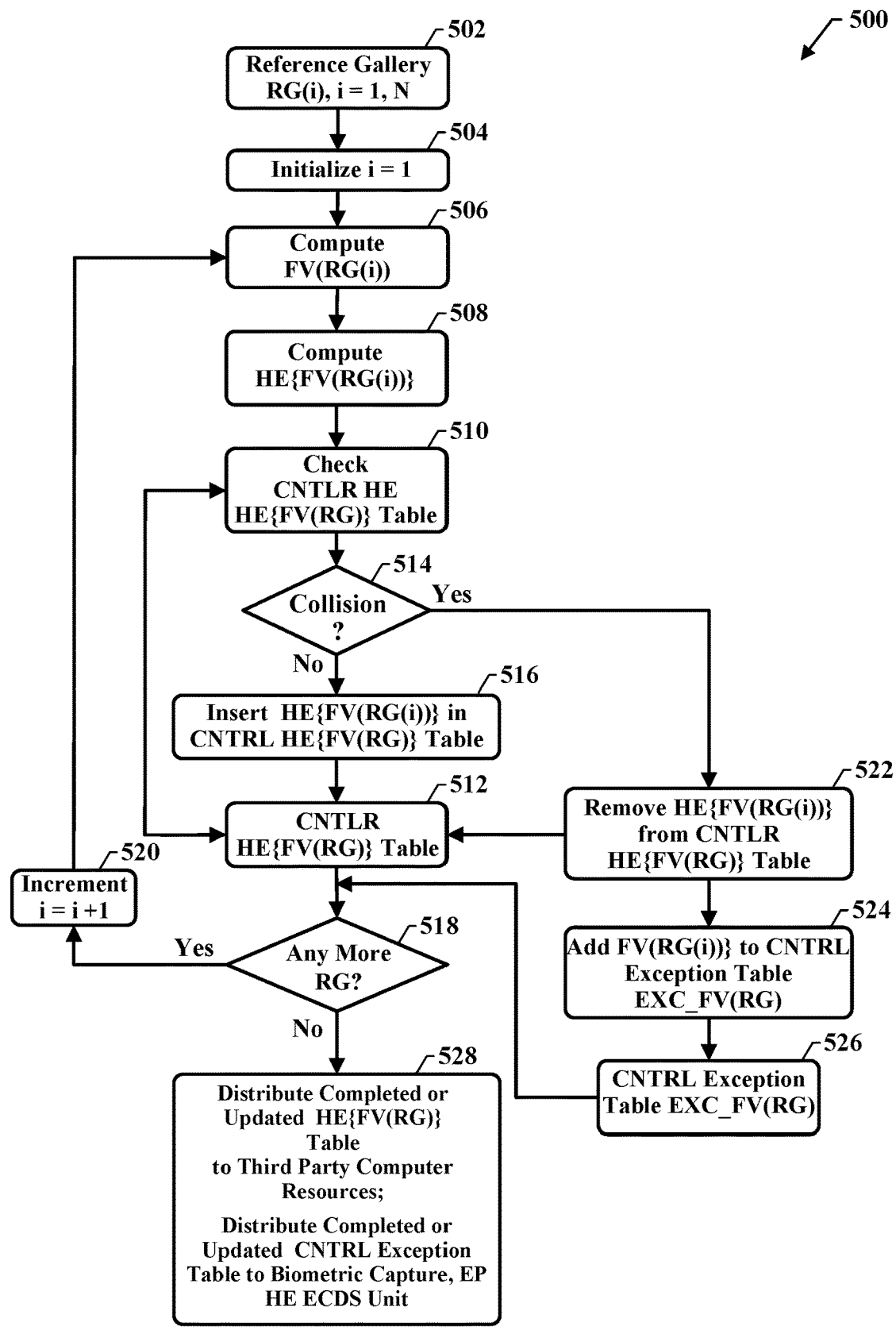
FIG. 5 shows a logic flow chart of operation in a process for privacy-protective, non-decrypting, distributed HE domain biometrics identification and verification processing, including a priori distributing of exceptions for cleartext failover, in accordance with various embodiments.

FIG. 5 shows a logic flow chart of operations in flow 500, in a process of generating and distributing by a system controller a HE encrypted reference biometric FV table for a third-party computer resource, e.g., the system 300 third-party computer resource 206, and a controller-generated fail-over exception table for a biometric capture and HE encrypted distribution unit, e.g., the biometric capture, EP HE ECDS unit 202. Operations will be described assuming the biometric reference images are facial images. Persons of ordinary skill in the pertinent arts, upon reading this disclosure in its entirety, can adapt the described flow 500 to generating a reference biometric HE vector table for fingerprints or other biometric information. Description of an example flow 500 will assume a biometric reference gallery 502 of integer N reference images, RG(i), i=1, N.

Operations in the flow 500 can include initializing 504 the "i" index to integer 1, and then proceeding to compute 506 a feature vector FV(RG(i)) from the RG(i), at i equal to integer 1. As used herein, in contexts such as "compute 506 a feature vector," the term "compute" and variants thereof, e.g., "compute," "computed," and so forth, encompass, without limitation, "extract," "calculate," "determine," "obtain," and "identify," and can include multi-step operations such as, without limitation, convolving a feature filter over reference image, or a cascading of stages of convolving stage-specific feature filters. In one or more embodiments computing 506 the feature vector can include applying an orthogonal basis transformation, for example and without limitation, DCT, DWT, Walsh Transform, or Walsh Hadamard Transform WHT.

The flow 500 can proceed from computing 506 the feature vector, FV(RG(i)), of RG(i) to HE encrypting 508 the feature vector FV(RG(i)) to obtain HE{FV(RG(i))}. Operations in the flow 500 can proceed from HE encrypting 508 the feature vector FV(RG(i)) to collision checking 510 the controller maintained (labeled "CNTLR" in FIG. 5) HE{FV (RG)}table 512 to determine if HE{FV(RG(i))} matches an already present HE encrypted FV in the CNTLR HE{FV (RG)}table 512. Since the assumed starting state includes an empty CNTLR HE{FV(RG)}table 512, the collision checking 510 will produce a negative result, i.e., no collision. Operations in the flow 500 can, in response, as indicated by the "No" outbranch from flow decision 514, proceed to inserting 516 the HE{FV(RG(1))} in the CNTLR HE{FV (RG)}table 512. Since the index i is at integer 1, there are further RGs in the biometric reference gallery 502, and operations in the flow 500 proceed from the "Yes" outbranch of decision block 518 to increment 520 the i index by integer 1 and return to compute 506 the feature vector for RG(2).

Operations according to the flow 500 can proceed from the computing 506 the feature vector for RG(2) to HE encrypting 508 FV(RG(2)), to collision checking 510 HE{FV(RG(2))} the CNTLR HE{FV(RG)}table 512, inserting 516 HE{FV(RG(2))} in the CNTLR HE{FV(RG) }table 512, to incrementing 520 the i index by integer 1. The loop of 506, 508, 510, 514, 516, and 518 can repeat until, for example, when "i" is at an arbitrary " "BX," the answer to the determining 510 will be a "yes, indicating a HE encryption collision, i.e., the CNTLR HE{FV(RG)}table 512, already includes a HE encrypted feature vector that matches HE{FV(RG(BX))}. This means that the HE vector, i.e., the HE encryption of a FV of an earlier processed reference gallery image, for example RG(X), and current HE{FV(RG (BX))} are identical. Operations in the flow 500, in response, can remove 522 the already present HE{FV(RG (BX))} from the CNTLR HE{FV(RG)}table 512, and insert or add 524 HE{FV(RG(BX))} to the CNTRL Exception Table EXC_FV(RG) 526. In an embodiment, the CNTRL Exception Table EXC_FV(RG) 526 can be a controller stored construction of a distributed exception table, which can implement the FIG. 3 system 300 Central HE Vector Exception Table 306. Operations in the flow 500 can proceed from adding 524 HE{FV(RG(BX))} to the CNTRL Exception Table EXC_FV(RG) 526 to the determining 518 if there are any more RGs in the biometric reference gallery 502.

It will be understood that "remove," in the context of remove 522 the already present HE{FV(RG(BX))} from the CNTLR HE{FV(RG)}table 512 can mean to flag the already present HE{FV(RG(BX)) as a collision value, for use by collision checking 510 in subsequent loops.

Operations in the flow 500 can continue as described above, as a sequence of loops, incrementing index i by integer 1 and either adding 516 another HE{FV(RG(i))} to the CNTLR HE{FV(RG)}table 512, or removing another HE{FV(RG(i))} from the CNTLR HE{FV(RG)}table 512 and adding it to the CNTRL Exception Table EXC_FV(RG) 526, until the branch 518 determines there are no more RGS in the biometric reference gallery 502. Operations in the flow 500 can then proceed to communicating the constructed CNTLR HE{FV(RG)}table 512 to the third-party computer resources 206 and communicating the constructed CNTRL Exception Table EXC_FV(RG) 526 to the biometric capture, EP HE ECDS unit 202.

FIG. 6 teaches a block schematic of a computer system 600 on which aspects of systems and method in accordance with the present disclosure can be practiced. The third-party computer resource 206, reference gallery 210, local computing and controller 102, biometric database 122-1, biometric capture, exception protective HE encryption and distribution unit 202, and other disclosed devices may comprise some or all of the hardware shown in system 600 and may comprise some or all of the hardware described with reference to FIG. 6.

FIG. 6 shows an implementation of the computer system 600 including a hardware processor 602 and an instruction memory 604 that can be coupled to one another through a bus 606. Implementations of the hardware processor 602 can include, but are not limited to, ASIC (application-specific integrated circuit), FPGA (field programmable gate array), a generic-array of logic (GAL), and their equivalents. The computer system 600 can include a general memory 604 and a large capacity storage 626, each of which can be coupled, for example, via the bus 606 to the hardware processor 602. It will be understood that the instruction memory 608 and the general memory 604 are logic functions and can be implemented, for example, as respective resources of a shared memory resource.

The instruction memory 608 and general memory 604 can be implemented as tangible, computer readable, non-transitory storage media, (e.g., ROM (read-only memory), EPROM (electrically programmable read-only memory), EEPROM (electrically erasable programmable read-only memory), flash memory, static memory, DRAM (dynamic random-access memory), SRAM (static random-access memory). The computer system 600 can include a mobile device interface module 610, which can implement, for example, a Bluetooth interface between the kiosk 106 and the mobile device 108. The computer system 600 can include a HE encryption module 614 and AI classifier training module 615. The computer system 600 can also include a PCA processing module 616 and a transform module 618, The transform module 618 can include computer executable instructions that can cause the hardware processor 602 to perform DCT, and Discrete Wavelet Transform (DWTs.) The computer system 600 may be coupled, for example, via a network interface module 620, to a network resource such as the WAN (wide area network) 622, such as the Internet and to a local network 624.

Computer Program Product

The computer system 600 may be configured to run or may comprise a computer program or software stored on tangible, non-transitory computer readable. The computer program is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes. A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Conclusion

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means. While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

In some configurations, the processes shown in FIGS. 4 and 5 may be implemented by kiosk 106 (uploading station 400), Third-Party HE Domain AI Biometric Verify and Identify (VF-ID) Resources 614, and the third-party computer 150 of U.S. patent application Ser. No. 18/080,294. For example, the collision processing 420, FIG. 4 may be performed by uploading station 400, the failover process and exception handling 500, FIG. 5 could be performed by any of the systems described in Ser. No. 18/080,294, biographic to biometric verification 426, FIG. 4 could be performed by the systems of FIGS. 1-8 of Ser. No. 18/080,294. The screening area may comprise an access control device as described as element 170 in U.S. patent application Ser. No. 18/080,294 incorporated by reference in its entirety. Additionally, the biometric capture HE Vector Distribution for VFID may be implemented as a Kiosk 106 or Uploading Station from Ser. No. 18/080,294, and/or aspects of the Kiosk or Uploading Station may be combined with biometric capture HE Vector Distribution for VFID. Similarly, and by way of illustration—not limitation, third-party resource 206 may comprise some of the functionality or structure of third-party computer 150 of Ser. No. 080,294. In further example, the HE domain classifier configuring logic 208 may comprise some or all of the structure or functionality of the HE domain classifier 310 of Ser. No. 18/020,294.

Although the subject matter has been described in language specific to example structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A method for exception failover augmented, homomorphic encrypted (HE) distributing, and end-to-endpoint persistent encryption, and distributed HE domain non-decrypting, privacy-protective biometric processing, comprising:
capturing a biometric information of an individual as a biometric record;
computing a biometric feature data based at least in part on the biometric record;
generating HE biometric feature data based at least in part on homomorphic encrypting the biometric feature data;
determining an exception status of the HE biometric feature data, between exception and non-exception;
responsive to the non-exception status:
HE distributing the HE biometric feature data to an external computer processing resource;
performing, by the external computer processing resource, a HE domain, non-decrypting biometric classifying of the HE biometric feature data, and sending from the external computer processing resource to a designated destination a result of the HE domain, non-decrypting biometric classifying; and
responsive to the exception status: performing a non-distributed classifying of the biometric feature data, or the biometric record.

2. The method of claim 1 for exception failover augmented, HE encryption and persistent HE, privacy-protective distributed non-decrypting HE domain biometric processing, further comprising:
receiving a biographical information of a user;
generating a temporary identifier;
storing a correspondence between the temporary identifier and at least a portion of the biographical information;
communicating, in association with communicating the biometric information to the external computer processing resource, the temporary identifier to the external computer processing resource; and
communicating, by the external processing resource, the temporary identifier in association with the result of the HE domain, non-decrypting biometric classifying.

3. The method of claim 1 for exception failover augmented, HE encryption and persistent HE, privacy-protective distributed non-decrypting HE domain biometric processing, further comprising configuring the external processing resource to perform the HE domain, non-decrypting biometric classifying of the homomorphic encrypted biometric feature data.

4. The method of claim 3 for exception failover augmented, HE encryption and persistent HE, privacy-protective distributed non-decrypting HE domain biometric processing, further comprising:
generating a HE biometric reference gallery, including a HE biometric reference data for each of N identities; and
the configuring the external processing resource to perform the HE domain, non-decrypting biometric classifying of the HE biometric feature data to include:
communicating the HE biometric reference gallery to the external processing resource; and
configuring the external processing resource to perform the classifying of the HE biometric feature data based at least in part on computing a respective similarity between the HE biometric feature data and the HE biometric reference data for each of the N identities.

5. The method of claim 1 for exception failover augmented, HE encryption and persistent HE, privacy-protective distributed non-decrypting HE domain biometric processing, further comprising:
the determining the exception status of the HE biometric feature data, between exception and non-exception including;
determining whether the HE biometric feature data differs from all stored generated HE biometric feature data in an accumulated HE biometric feature data database;
responsive to determining the HE biometric feature data differs from all stored generated HE biometric feature data in the accumulated HE biometric feature data database; determining the exception status as non-exception and storing the HE biometric feature data in the accumulated database of generated HE biometric feature data; and
based at least in part on determining the HE biometric feature data is not different from all stored generated HE biometric data in the accumulated database of generated HE biometric feature data, determining the exception status as exception.

6. The method of claim 5 for exception failover augmented, HE encryption and persistent HE, privacy-protective distributed non-decrypting HE domain biometric processing, further comprising:
receiving a biographical information of a user; and
storing the HE biometric feature data in the accumulated database of generated HE biometric feature data to include storing, in association with the generated HE biometric feature data, at least a portion of the biographic information of the user as a stored biographic information.

7. The method of claim 6 for exception failover augmented, HE encryption and persistent HE, privacy-protective distributed non-decrypting HE domain biometric processing, further comprising:
responsive to determining the HE biometric feature data is stored in the accumulated database, comparing the biographic information of the user to the stored biographic information associated with the stored HE biometric feature data;
storing the HE biometric feature data in the accumulated database of generated HE biometric feature data to include storing, in association with the generated HE biometric feature data, at least a portion of the biographic information in the accumulated database of generated HE biometric feature data;
generating a temporary identifier; and
storing a correspondence between the temporary identifier and at least a portion of the biographical information.

8. The method of claim 1 comprising:
an interface session logic of a biometric capture, EP HE ECDS unit storing a correspondence (TID(k)↔BGH(k)), between captured biographic information BGH(k) and a temporary identifier TID(k);
the biometric capture, EP HE ECDS unit appending TID(k) to communications from the unit to a third-party computer resource of HE encrypted biometric information of a $k^{th}$ user;
the third-party computer resource appending TID(k) to processing results the third-party computer resource communicates back to the biometric capture, EP HE ECDS unit;

the biometric capture, EP HE ECDS unit including a biometric capture device; the biometric capture device capturing one or more types of biometric information (BM(k)) of the $k^{th}$ user;

the biometric capture, EP HE ECDS unit including biometric feature vector logic; the biometric feature vector logic computing from the biometric information BM(k), a biometric feature vector FV(BM(k));

the biometric capture, EP HE ECDS unit including HE encrypting logic; the HE encrypting logic HE encrypting FV(BM(k)) to generate HE{FV(BM(k))}; and uploading HE encrypted biometric information to a biometric reference gallery holding biometric information in memory.

9. The method of claim 8 comprising the step of the biometric capture device capturing a row-by-column pixel array of a facial image of the $k^{th}$ user.

10. The method of claim 8 wherein the biometric feature vector logic computes FV(BM(k)) using an orthogonal basis function transformation selected from the list consisting essentially of DCT, DWT, Walsh Transform, WHT, and combinations thereof.

11. The method of claim 8 comprising the step of exception detection and failover logic detecting collisions as an exception and providing failover biometric processing in response.

12. The method of claim 8 wherein the step of providing failover biometric processing in response further comprises biometric classifying, relative to the biometric reference gallery, of:
a cleartext version of the feature vector FV(BM(k)) computed by the biometric feature vector logic; or
a cleartext version of the captured biometric image BM(k).

13. The method of claim 8 wherein the exception detection and failover logic includes a holding memory; the holding memory storing temporarily a copy of the captured biometric information BM(k) and a copy of the biometric feature vector FV(BM(k)).

14. The method of claim 8 comprising the steps of
HE domain classifier configuring logic configuring the third-party computer resource to perform non-decrypting HE domain classifying of the uploaded HE encrypted biometric information of the $k^{th}$ user;
the third-party computer resource configuring non-decrypting HE domain 1: N classifying of the user's HE encrypted biometric information against N verified reference identifies for which the biometric reference gallery stores reference biometric information;
the biometric reference gallery storing a gallery of biometric reference images (RG(i), i=1 to N); the biographic reference images RG captured from a population of N different, verified individuals
the biometric reference gallery storing, for each of N identities, one or more biometric reference images RG, of one or more biometric types; wherein the biometric types are selected from the list consisting essentially of biometric reference images RG, eye scan images, facial images, fingerprint images, and combinations thereof, for each of N identities; and the biometric reference images (RG) are selected from the list consisting essentially of images at different capture angles, different lightings, different facial expressions and different fingers.

15. The method of claim 14 wherein the HE encrypted reference gallery generating logic comprises:
feature vector generating logic generating logic generating FV(RG(i)) for i=1 to N by applying an orthogonal basis transformation;
HE encryption logic generating HE{FV(RG(i))}, for i=1 to N; and
uploading logic uploading the HE encrypted biometric reference gallery (HE{FV(RG(i))}, i=1 to N) to the third-party computer resource.

16. The method of claim 8 comprising the steps of:
generating HE encryption of a feature vector of a first user's biometric information (FV(BM(k1)));
generating HE encryption of a feature vector of a second user's biometric information FV(BM(k2));
wherein HE encryption of the feature vector of a first user's biometric information is identical to the HE encryption of the feature vector of a second user's biometric information, irrespective of the two feature vectors having different values; and
detecting a collision wherein the first user feature vector and the second user feature vector, k1 not being equal to k2, and FV(BM(k1)) not being equal to FV(BM(k2)), there is an instance of HE{FV(BM(k1))} being identical to HE{FV(BM(k2))}.

17. The method of claim 16 wherein the exception detection and failover logic comprises:
an accumulated homomorphic encrypted feature vector memory (Accumulated HE{FV} MRY);
an exception detection and memory update logic; the exception detection and memory update logic connected to the HE encrypting logic of the biometric capture, EP HE ECDS unit; the HE encrypting logic is configured such that uploading of HE{FV(BM(k))} is conditioned on verification by the exception detection and memory update logic that the HE{FV(BM(k))} value is not a collision with an earlier HE{FV(BM(k'))}, FV(BM(k')) being an earlier computed biometric feature vector FV(BM(k')), for a biometric image BM(k') captured from a k' user; and
a local failover verification and identification logic (LCL FO VF-ID Logic); the local failover verification and identification controlling biometric classification relative to the biometric reference gallery of cleartext feature vector FV(BM(k)) or cleartext captured biometric image BM(k) held in the holding memory.

18. The method of claim 16 comprising the steps of:
the exception detection and memory update logic determines HE{FV(BM(k))} is not a collision with an earlier HE{FV(BM(k'))}; and
the HE encrypting logic uploads HE{FV(BM(k))} and TID(k) to FV similarity logic in the third-party computer resource; the third-party computer resource comprising a matching output logic;
the matching output logic sending a classification result and TID(k) to the biometric capture, EP HE ECDS unit or a third-party recipient; and
an HE domain classifier configuring logic configuring the third-party computer resource to perform non-decrypting HE domain classifying of the uploaded HE encrypted biometric information of the $k^{th}$ user.

19. The method of claim 18 wherein the step of configuring the third-party computer resource comprising the step of configuring for non-decrypting HE domain 1: N classifying of the user's HE encrypted biometric information against N verified reference identifies for which the biometric reference gallery stores reference biometric information.

20. The method of claim 19 wherein the biometric reference gallery stores a gallery of biometric reference images (RG(i), i=1 to N).

21. The method of claim 18 wherein the HE domain classifier configuring logic includes:
- HE encrypted reference gallery generating logic; the HE encrypted reference gallery generating logic generating a HE encrypted biometric reference gallery (HE{FV(RG(i))), i=1 to N); and
- uploading logic uploading the HE encrypted biometric reference gallery to the third-party computer resource; the HE encrypted biometric reference gallery entries include HE encryptions of feature vectors (FV(RG(i))) of the reference gallery images RG(i).

22. The method of claim 21 comprising the steps of:
the third-party computer resource receiving HE encrypted
- biometric reference gallery (HE{FV(RG(i))), i=1 to N); and
- feature vector similarity logic (FV similarity logic, HE{FV(BM(k))} against reference HE{FV(RG(i))}, i=1, N) determining a level of similarity between a current HE encrypted feature vector of biometric information k against a reference list of HE encrypted feature vectors reference gallery information i through N.

\* \* \* \* \*